US010359072B2

(12) United States Patent
Yoshimine et al.

(10) Patent No.: US 10,359,072 B2
(45) Date of Patent: Jul. 23, 2019

(54) JOURNAL BEARING AND ROTARY MACHINE (71) Applicant: MITSUBISHI HITACHI POWER SYSTEMS, LTD., Kanagawa (JP)

(72) Inventors: Chihiro Yoshimine, Tokyo (JP); Takeshi Sano, Tokyo (JP); Yuki Sumi, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/528,636

(22) PCT Filed: Nov. 27, 2015

(86) PCT No.: PCT/JP2015/083399
§ 371 (c)(1),
(2) Date: May 22, 2017

(87) PCT Pub. No.: WO2016/084937
PCT Pub. Date: Jun. 2, 2016

(65) Prior Publication Data
US 2017/0260874 A1 Sep. 14, 2017

(30) Foreign Application Priority Data
Nov. 28, 2014 (JP) .................................. 2014-241173

(51) Int. Cl.
*F16C 17/02* (2006.01)
*F16C 17/03* (2006.01)
(Continued)

(52) U.S. Cl.
CPC ............ *F16C 17/03* (2013.01); *F01D 25/168* (2013.01); *F01D 25/18* (2013.01); *F01D 25/183* (2013.01);
(Continued)

(58) Field of Classification Search
CPC ........ F16C 17/02; F16C 17/022; F16C 17/03; F16C 17/035; F16C 33/046; F16C 33/10;
(Continued)

(56) References Cited

U.S. PATENT DOCUMENTS 5,772,335 A * 6/1998 Miller .................... F16C 17/03
384/117
6,739,756 B2 * 5/2004 Miller .................... F16C 17/03
384/117
(Continued)

FOREIGN PATENT DOCUMENTS

JP 2003-120672 4/2003
JP 2004-156690 6/2004
(Continued)

OTHER PUBLICATIONS

International Search Report dated Feb. 16, 2016 in International Application No. PCT/JP2015/083399, with English translation.
(Continued)

*Primary Examiner* — James Pilkington
(74) *Attorney, Agent, or Firm* — Wenderoth, Lind & Ponack, L.L.P.

(57) ABSTRACT

A journal bearing includes: a rotation shaft which is rotatable about an axis; a bearing lower half portion which slidably supports an outer circumferential surface of the rotation shaft; a bearing upper half portion which supports an upper side half portion of the outer circumferential surface of the rotation shaft; and a lubricating oil supply device which supplies lubricating oil between the bearing lower half portion and the bearing upper half portion, and the rotation shaft, wherein the bearing upper half portion includes a bearing body which faces the outer circumferential surface of the upper half portion of the rotation shaft, a land portion which protrudes inward in a radial direction from an inner circumferential surface of the bearing body, (Continued)

and a guide portion which guides lubricating oil to the sliding surface of the land portion.

9 Claims, 8 Drawing Sheets

(51) Int. Cl.
    *F16C 33/04*     (2006.01)
    *F16C 33/10*     (2006.01)
    *F01D 25/16*     (2006.01)
    *F01D 25/18*     (2006.01)

(52) U.S. Cl.
    CPC ............ *F16C 17/02* (2013.01); *F16C 33/046* (2013.01); *F16C 33/10* (2013.01); *F16C 33/1065* (2013.01); *F05D 2220/31* (2013.01); *F16C 2360/00* (2013.01); *F16C 2360/23* (2013.01)

(58) Field of Classification Search
    CPC   F16C 33/1045; F16C 33/1055; F16C 33/106; F16C 33/1065; F16C 33/108; F16C 2360/00; F16C 2360/23; F01D 25/18; F05D 2220/31

USPC .......................................... 384/117, 118, 122
See application file for complete search history.

(56) References Cited

U.S. PATENT DOCUMENTS

2010/0220944 A1     9/2010   Waki et al.
2013/0028731 A1     1/2013   Mimura et al.

FOREIGN PATENT DOCUMENTS

| | | |
|---|---|---|
| JP | 2006-090524 | 4/2006 |
| JP | 2010-203481 | 9/2010 |
| JP | 2011-179609 | 9/2011 |
| JP | 2013-253650 | 12/2013 |

OTHER PUBLICATIONS

Written Opinion of the International Search Authority dated Feb. 16, 2016 in International Application No. PCT/JP2015/083399, with English translation.

\* cited by examiner

JOURNAL BEARING AND ROTARY MACHINE

BACKGROUND OF THE INVENTION

1. Technical Field

The present invention relates to a journal bearing and a rotary machine.

Priority is claimed on Japanese Patent Application No. 2014-241173, filed Nov. 28, 2014, the content of which is incorporated herein by reference.

2. Description of the Related Art

Various techniques have been put into practical use as bearings for rotatably supporting a rotation shaft of a rotary machine. In particular, a tilting pad bearing is widely used as a journal bearing for supporting a horizontally extending rotation shaft from below. Generally, the tilting pad bearing includes a plurality of pads arranged in a circumferential direction of the rotation shaft and a carrier ring covering the plurality of pads from an outer circumferential side. A certain gap is provided between an outer circumferential surface of the rotation shaft and the pad. By supplying lubricating oil to this gap, the outer circumferential surface of the rotation shaft and an inner circumferential surface of the pad come into sliding contact with each other in a lubricated state.

As a detailed example of such a journal bearing, a known tilting pad journal bearing is described in Japanese Unexamined Patent Application, First Publication No. 2011-179609. The journal bearing includes a plurality of tilting pads, which are arranged in a circumferential direction of a rotation shaft to rotatably support the rotation shaft and a pair of plates, which are provided to face surfaces on both sides in the axial direction of each of the rotation shafts of the tilting pads.

SUMMARY OF THE INVENTION

1. Technical Problem

However, there is a possibility that the journal bearing described in JP 2011-179609 cannot appropriately support the rotation shaft when the operating state of the rotary machine changes. For example, when vibration occurs in the rotary machine, when swinging vibration occurs on the rotation shaft itself, or when an external load is applied to the rotary machine due to the scattering of a turbine blade, there is a possibility that an upward load may be applied to the rotation shaft in addition to the downward load described above.

When such an upward load occurs, the rotation shaft slightly moves upward to contact with a carrier ring of an upper half portion. However, a device for actively supplying lubricating oil is not provided at the upper half portion of the journal bearing. In addition, when such a journal bearing is applied to the horizontally extending rotation shaft, lubricating oil inside the bearing is apt to stay at a lower side due to gravity.

Thus, the upper half portion of the journal bearing does not have sufficient lubrication performance compared to a lower half portion thereof. Accordingly, when the tilting pad located at the upper half portion contacts with the rotation shaft, there is a possibility that damage may occur to both components.

Meanwhile, there is a possibility that energy loss of the bearing may increase when the lubricating oil supply amount increases. For this reason, there has been a high demand for a bearing capable of improving lubricating performance without increasing or decreasing the amount of lubricating oil.

The present invention has been made in view of the above-described circumstances and an object of the present invention is to provide a journal bearing capable of exhibiting sufficient lubrication performance with a small amount of lubricating oil and a rotary machine including the same.

2. Solution to the Problem

According to a first aspect of the present invention, there is provided a journal bearing including: a bearing lower half portion which slidably supports an outer circumferential surface of a rotation shaft rotatable about an axis extending in a horizontal direction from blow; a bearing upper half portion which supports an upper side half portion of the outer circumferential surface of the rotation shaft; and a lubricating oil supply device which supplies lubricating oil between the bearing lower half portion and the bearing upper half portion, and the rotation shaft, wherein the bearing upper half portion includes a bearing body which faces the outer circumferential surface of the upper side half portion of the rotation shaft with a space therebetween, a land portion which protrudes inward in a radial direction from an inner circumferential surface of the bearing body to form a sliding surface with the rotation shaft and extends in a circumferential direction, and a guide portion which guides the lubricating oil to the sliding surface of the land portion.

According to the above-described configuration, the lubricating oil, which is supplied by the lubricating oil supply device, is guided toward the sliding surface of the land portion by the guide portion provided at the bearing upper half portion in accordance with the rotation of the rotation shaft. Accordingly, the lubricating oil can also be widely distributed between the bearing upper half portion and the rotation shaft.

In addition, the lubricating oil staying at the side of the bearing lower half portion can be supplied toward the bearing upper half portion since the guide portion is provided. Accordingly, the bearing upper half portion can also be lubricated without increasing the lubricating oil supply amount.

According to a second aspect of the present invention, in the journal bearing according to the first aspect, the guide portion may include an oil collecting wall which is provided on the inner circumferential surface and extends in an approach direction from the inner circumferential surface to the land portion as it goes from a rear side in a rotation direction of the rotation shaft toward a front side in the rotation direction, and an inclined portion which is provided on the rear side in the rotation direction of the oil collecting wall and extends obliquely from the inner circumferential surface toward the sliding surface.

According to the above-described configuration, the lubricating oil which flows along the inner circumferential surface of the bearing body is collected toward the land portion by the oil collecting wall and then is supplied onto the sliding surface of the land portion by the inclined portion. Accordingly, the bearing upper half portion and the rotation shaft are lubricated through the lubricating oil on the sliding surface.

According to a third aspect of the present invention, in the journal bearing according to the first aspect, the guide portion may be formed of an inflow hole which is formed on an end surface of the land portion at the rear side in the rotation direction and into which the lubricating oil flows, a supply hole which is formed on the sliding surface and supplies the lubricating oil to the sliding surface, and an oil supply pipe which communicates the inflow hole and the supply hole with each other.

According to the above-described configuration, the lubricating oil which flows from the inflow hole is supplied onto the sliding surface through the oil supply pipe and the supply hole. Accordingly, the bearing upper half portion and the rotation shaft are lubricated through the lubricating oil on the sliding surface.

According to a fourth aspect of the present invention, in the journal bearing according to any one of the first to third aspects, a guide groove may be formed on the sliding surface so as to be recessed outward in a radial direction from the sliding surface and to extend toward a center area in the axial direction from both edges in the axial direction of the sliding surface as it goes toward the front side in the rotation direction.

According to the above-described configuration, the lubricating oil is guided toward the center area in the axial direction on the sliding surface by the guide groove. Accordingly, a film thickness of an oil film of the lubricating oil formed on the sliding surface can be maintained.

According to a fifth aspect of the present invention, in the journal bearing according to any one of the first to fourth aspects, the bearing upper half portion may include a plurality of the land portions and a plurality of the guide portions arranged in the circumferential direction.

According to the above-described configuration, the plurality of land portions and the plurality of guide portions are arranged in the circumferential direction. Accordingly, the bearing upper half portion can be lubricated over a wider range in the circumferential direction.

According to a sixth aspect of the present invention, in the journal bearing according to any one of the first to fifth aspects, the bearing upper half portion may include a plurality of the land portions arranged at intervals in the axial direction.

According to the above-described configuration, the plurality of land portions which are arranged at intervals in the axial direction are formed in the bearing upper half portion. Accordingly, the rotation shaft can be more stably supported. In addition, since a load applied to each land portion can be reduced, abrasion of the bearing upper half portion and the bearing lower half portion due to aging can be suppressed.

According to a seventh aspect of the present invention, in the journal bearing according to any one of the first to sixth aspects, the lubricating oil supply device may include an end supply device which is provided between the bearing upper half portion and the bearing lower half portion in a circumferential direction of the rotation shaft, wherein the end supply device may include a front supply part which blows the lubricating oil toward the front side in the rotation direction and a rear supply part which blows the lubricating oil toward the rear side in the rotation direction.

According to the above-described configuration, the lubricating oil can be sufficiently supplied to each of the bearing upper half portion and the bearing lower half portion by the front supply part and the rear supply part. Particularly, as compared to a case in which the lubricating oil is supplied only to the inside in the radial direction with respect to the axis, the lubricating oil can be more actively supplied to the bearing upper half portion and the bearing lower half portion.

According to an eighth aspect of the present invention, in the journal bearing according to the seventh aspect, the front supply part may be provided in an area corresponding to the land portion in the axial direction.

According to the above-described configuration, since the front supply part is provided in an area corresponding to the land portion in the axial direction, the lubricating oil can be directly supplied to the land portion. That is, a sufficient amount of the lubricating oil can be widely distributed in the land portion.

According to a ninth aspect of the present invention, in the journal bearing according to the seventh or eighth aspect, the rear supply part may be provided in an area corresponding to the bearing lower half portion in the axial direction.

According to the above-described configuration, since the rear supply part is provided in an area corresponding to the bearing lower half portion in the axial direction, the lubricating oil can be directly supplied to the bearing lower half portion. That is, a sufficient amount of the lubricating oil can be widely distributed in the bearing lower half portion.

According to a tenth aspect of the present invention, in the journal bearing according to any one of the seventh to ninth aspects, the rear supply part may be provided only in an area corresponding to the land portion in the axial direction.

According to the above-described configuration, the lubricating oil can also be supplied from the front side in the rotation direction of the land portion. That is, the lubricating oil can be more sufficiently distributed in the land portion.

According to an eleventh aspect of the present invention, the rotary machine includes the journal bearing according to any one of the first to tenth aspects and the rotation shaft supported by the journal bearing.

According to the above-described configuration, since the rotation shaft is supported by the journal bearing, a rotary machine which can be stably operated can be provided.

3. Advantageous Effects of the Invention

According to the present invention, it is possible to provide a journal bearing capable of exhibiting sufficient lubrication performance with a small amount of lubricating oil and a rotary machine including the same.

DETAILED DESCRIPTION OF THE INVENTION

First Embodiment

Hereinafter, a journal bearing 10 and a rotary machine 100 according to a first embodiment of the present invention will be described with reference to the drawings.

Figure 1:
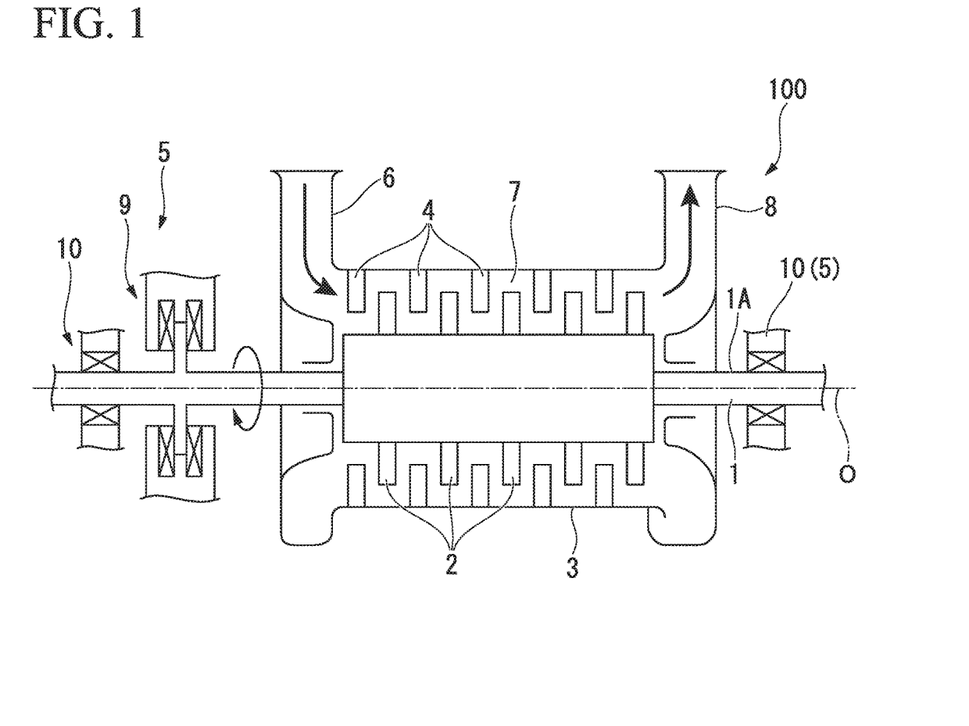
FIG. 1 is a schematic diagram showing a rotary machine according to each embodiment of the present invention.

As shown in FIG. 1, a steam turbine 100 which is a rotary machine 100 includes a rotation shaft 1 which rotates about an axis O extending in the horizontal direction, a plurality of blades 2 which are provided on an outer circumferential surface 1A of the rotation shaft 1, a casing 3 which covers the rotation shaft 1 from an outer circumferential side thereof, a plurality of stators 4 which are provided on an inner circumferential surface of the casing 3 and are disposed in a staggered arrangement in a direction of an axis O relative to the blades 2, and a plurality of bearing portions 5 which support the rotation shaft 1.

Steam of high temperature and high pressure is supplied from the outside to the steam turbine 100 through a steam inflow portion 6 provided in the casing 3. This steam flows through a steam passage 7 defined between the blades 2 and the stators 4. When the steam collides with the blades 2 while flowing through the steam passage 7, the rotation shaft 1 rotates. The rotation energy of the rotation shaft 1 is extracted by a generator (not shown) to generate electric power or the like. The steam which has been used to rotate the rotation shaft 1 is discharged to the outside through an exhaust port 8 provided in the casing 3.

The bearing portion 5 is a device which supports both ends of the rotation shaft 1 in the direction of the axis O. The bearing portion 5 of the embodiment includes one thrust bearing 9 and two journal bearings 10. The thrust bearing 9 is a device which supports the load to the rotation shaft 1 in the direction of the axis O. Meanwhile, the journal bearing 10 is a device which supports the rotation shaft 1 from a direction intersecting the axis O.

Figure 2:
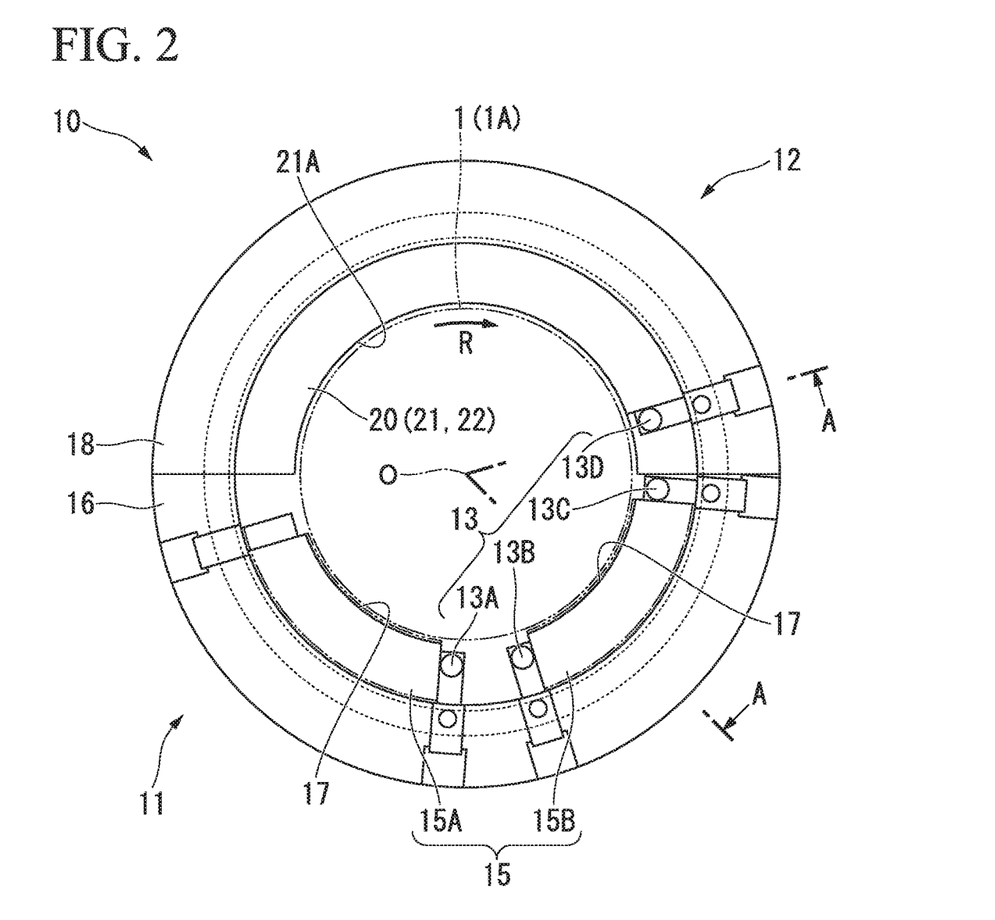
FIG. 2 is a diagram showing a journal bearing according to each embodiment of the present invention when viewed from an axial direction.
Figure 3:
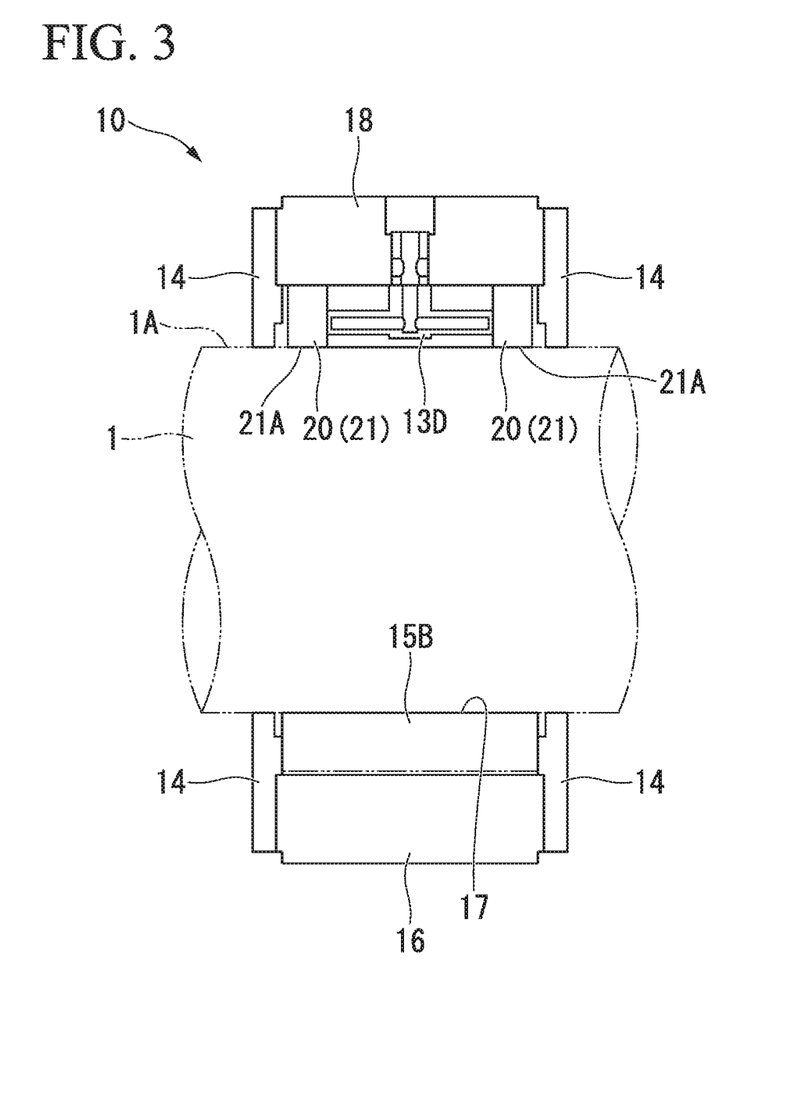
FIG. 3 is a cross-sectional view taken along a line A-A of FIG. 1.

Hereinafter, the journal bearing 10 will be described in detail. As shown in FIG. 2, the journal bearing 10 includes a bearing lower half portion 11 which supports the outer circumferential surface 1A of the rotation shaft 1 from below, a bearing upper half portion 12 which supports an upper side half portion of the outer circumferential surface 1A of the rotation shaft 1, a lubricating oil supply device 13 which supplies lubricating oil between the bearing lower half portion 11 and the bearing upper half portion 12, and the rotation shaft 1, and a pair of side plates 14 which covers the bearing upper half portion 12, the bearing lower half portion 11, and the lubricating oil supply device 13 from both sides in the direction of the axis O.

The bearing lower half portion 11 includes a plurality of (two) bearing pads 15 which contact with the outer circumferential surface 1A of the rotation shaft 1 and a carrier ring lower half portion 16 which supports the bearing pads 15 from an outer circumferential side thereof. In terms of the rotation direction R of the rotation shaft 1, the two bearing pads 15 are respectively formed as a front pad 15A which is located on a front side in the rotation direction R and a rear pad 15B which is located on a rear side in the rotation direction R. The front pad 15A and the rear pad 15B are arranged to be separated from each other in the circumferential direction.

The front pad 15A and the rear pad 15B are formed to be curved in a circular-arc shape when viewed from the direction of the axis O and are formed in a rectangular shape when viewed from the circumferential direction. The radially inner surfaces of the front pad 15A and the rear pad 15B are formed to be curved outward in the radial direction to be formed as pad surfaces 17 thereof. The pad surfaces 17 contact with the outer circumferential surface 1A of the rotation shaft 1 to support the outer circumferential surface.

Further, the front pad 15A and the rear pad 15B are supported by a support portion (not shown) on an inner circumferential surface of the carrier ring lower half portion 16. The support portion supports outer surfaces of the front pad 15A and the rear pad 15B in the radial direction while coming into point-contact therewith so that these pads are slightly swingably supported. Accordingly, the journal bearing 10 includes a so-called tilting mechanism. When the rotation shaft 1 is displaced in the radial direction due to a vibration or the like, the front pad 15A and the rear pad 15B swing about the direction of the axis O to absorb the displacement.

Additionally, it is desirable to form the front pad 15A and the rear pad 15B of, for example, a metal material such as white metal (W87).

The bearing upper half portion 12 includes a bearing body 18 (a carrier ring upper half portion 18) which faces the outer circumferential surface 1A of the rotation shaft 1 with a gap therebetween and a guide metal 20 which is provided on an inner circumferential side of the carrier ring upper half portion 18.

The carrier ring upper half portion 18 is a circular-arc member that has substantially the same dimension as that of the carrier ring lower half portion 16. The guide metal 20 is fixed to the inside of the carrier ring upper half portion 18 in the radial direction.

The guide metal 20 includes a plurality of (two) land portions 21 which are in contact with the rotation shaft 1 and a plurality of (two) guide portions 22 which guide lubricating oil toward the land portion 21. The land portion 21 extends in the circumferential direction along the inner circumferential surface of the carrier ring lower half portion 16 to form a semi-circular-arc shape when viewed from the direction of the axis O. Further, the guide metal 20 protrudes inward in the radial direction from the inner circumferential surface of the carrier ring upper half portion 18 to have a substantially rectangular cross-section when viewed from the circumferential direction.

Among both surfaces of the land portion 21 in the radial direction, an inner surface in the radial direction has a radial dimension which substantially corresponds to the outer circumferential surface 1A of the rotation shaft 1. Accordingly, the inner surface of the land portion 21 in the radial direction is formed as a sliding surface 21A which slides on the outer circumferential surface 1A of the rotation shaft 1. In the guide metal 20 of the embodiment, two land portions 21 as described above are arranged with a gap therebetween in the direction of the axis O. That is, the rotation shaft 1 is supported by the sliding surfaces 21A of two guide metals 20.

Further, both surfaces of the land portion 21 of the axis O in the direction extend in a direction substantially orthogonal to the sliding surface 21A to be respectively formed as a land portion inner surface 211S and a land portion outer surface 212S.

Figure 4:
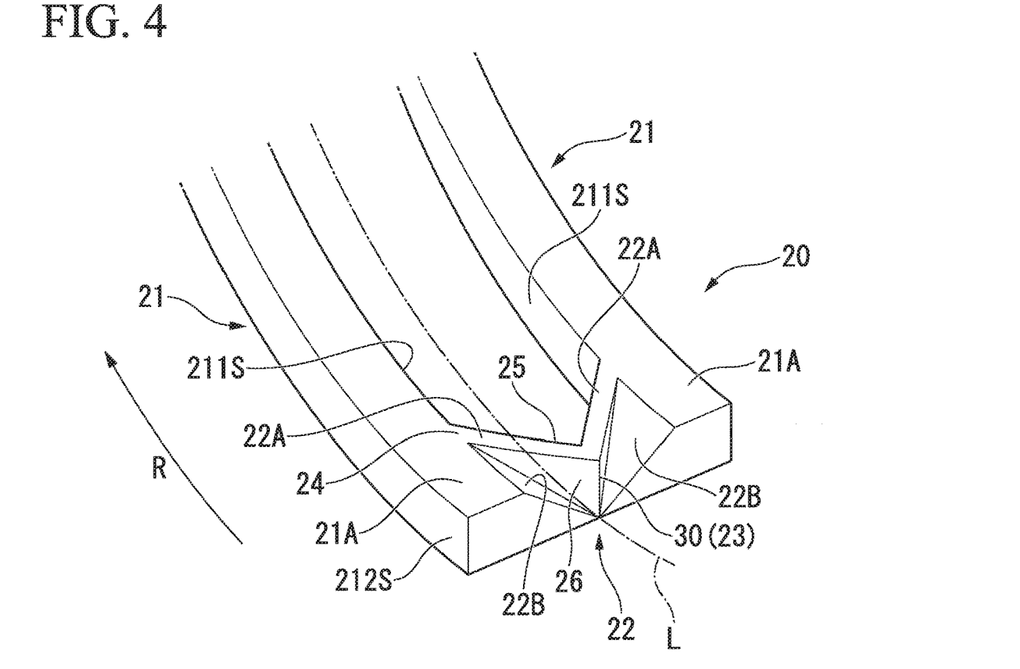
FIG. 4 is an enlarged view showing a land portion and a guide portion of a journal bearing according to a first embodiment of the present invention.

A guide portion 22 which guides lubricating oil is integrally provided at each land portion 21 formed with such a configuration. In the embodiment, the guide portion 22 is provided at a rear end of the land portion 21 in the rotation direction R. More specifically, the guide portion 22 includes an oil collecting wall 22A which is provided between two land portions 21 and an inclined portion 22B which is provided to be adjacent to the oil collecting wall 22A as shown in FIG. 4.

The oil collecting wall 22A is a wall surface which extends obliquely in a direction intersecting the axis O from the land portion inner surface 211S. More specifically, the oil collecting wall 22A extends toward the land portion inner surface 211S from an equidistant line L which equally divides an area between two land portions 21 on the inner circumferential surface of the carrier ring upper half portion 18 in the direction of the axis O. Further, the oil collecting wall 22A extends obliquely to be adjacent to the land portion inner surface 211S as it goes from the rear side in the rotation direction R toward the front side in the rotation direction.

In the oil collecting wall 22A with such a configuration, a rear edge in the rotation direction R is formed as a first edge 23. Further, a front edge in the rotation direction R is formed as a second edge 24. The first edge 23 is located on the equidistant line L. The second edge 24 is connected to the land portion inner surface 211S. Among both surfaces of the oil collecting wall 22A in the rotation direction, a surface facing the front side in the rotation direction R is formed as an oil collecting wall front surface 25. Similarly, a surface facing the rear side in the rotation direction R is formed as an oil collecting wall rear surface 26.

The oil collecting wall rear surface 26 is provided with the inclined portion 22B. As shown in FIG. 4, the inclined portion 22B is a surface which extends toward the sliding surface 21A of the land portion 21 from the outside in the radial direction of the first edge 23 of the oil collecting wall 22A. In other words, the inclined portion 22B extends obliquely at a certain angle with respect to the axis O when viewed from a direction intersecting the direction of the axis O. Further, the inclined portion 22B has a substantially triangular shape when viewed from the radial direction with respect to the axis O.

In the embodiment, each of the guide portions 22 is provided in each of two land portions 21 arranged in the direction of the axis O. More specifically, two guide portions 22 are line symmetrical to each other in the direction of the axis O with reference to the equidistant line L. Further, the first edges 23 of the oil collecting walls 22A of two guide portions 22 are integrally connected to each other on the equidistant line L to be formed as a ridge line portion 30. That is, two guide portions 22 extend from the ridge line portion 30 toward two land portion inner surfaces 211S to form a substantially V-shape when viewed from the circumferential direction.

Referring to FIG. 2 again, a plurality of (four) lubricating oil supply devices 13 are provided in the journal bearing 10 at intervals in the circumferential direction. More specifically, the lubricating oil supply device 13 includes a first oil supply nozzle 13A which is provided in the front pad 15A, a second oil supply nozzle 13B and a third oil supply nozzle 13C which are provided in the rear pad 15B, and a fourth oil supply nozzle 13D which is provided at the bearing upper half portion 12.

The first oil supply nozzle 13A is provided at the rear end of the front pad 15A in the rotation direction R. The second oil supply nozzle 13B and the third oil supply nozzle 13C are respectively provided at both ends of the rear pad 15B in the rotation direction. The fourth oil supply nozzle 13D is provided in the vicinity of the front end of the bearing upper half portion 12 in the rotation direction R to be separated from the third oil supply nozzle 13C.

The first oil supply nozzle 13A, the second oil supply nozzle 13B, and the third oil supply nozzle 13C all communicate with the outer circumferential surface of the carrier ring lower half portion 16 and the pad surfaces 17 of the front pad 15A and the rear pad 15B. The fourth oil supply nozzle 13D communicates the outer circumferential surface of the carrier ring upper half portion 18 and the inner circumferential surface of the guide metal 20 with each other. Lubricating oil is supplied from the outside to the oil supply nozzle (the lubricating oil supply device 13). Accordingly, the lubricating oil is supplied to the outer circumferential surface 1A of the rotation shaft 1.

Next, the operation of the journal bearing 10 will be described. As described above, since the journal bearing 10 supports the rotation shaft 1 extending in the horizontal direction, there is a tendency that lubricating oil stays at the lower side due to gravity. The lubricating oil staying at the lower side flows through an area between the bearing lower half portion 11 (the front pad 15A, the rear pad 15B) and the outer circumferential surface 1A of the rotation shaft toward the same direction as that of the rotation direction R of the rotation shaft 1 in accordance with the rotation of the rotation shaft 1. Finally, the lubricating oil passes through the front end of the bearing lower half portion 11 in the rotation direction R in accordance with the rotation of the rotation shaft 1 and then reaches the rear end of the bearing upper half portion 12 (the guide metal 20) in the rotation direction R.

Here, the guide portion 22 is provided at the rear end of the guide metal 20 (the land portion 21) in the rotation direction R. The lubricating oil which flows from the rear side in the rotation direction R is divided into two streams by the ridge line portion 30 in which the oil collecting walls 22A of the guide portions 22 are contact with each other. At the same time, the lubricating oil is guided onto the sliding surface 21A of the land portion 21 by each inclined portion 22B provided to be contact with the oil collecting wall 22A. More specifically, the inclined portion 22B obliquely connects the ridge line portion 30 and the sliding surface 21A to each other. Accordingly, the lubricating oil flows through the inclined portion 22B upward from below in an inclined direction in accordance with the rotation of the rotation shaft 1 and then flows onto the sliding surface 21A. The lubricating oil which arrives on the sliding surface 21A flows on the sliding surface 21A toward the front side in the rotation direction R in accordance with the rotation of the rotation shaft 1. Accordingly, the lubricating oil can be widely distributed on the sliding surface 21A in the circumferential direction.

As described above, according to the journal bearing 10 of the embodiment, the guide portion 22 guides the lubricating oil toward the sliding surface 21A of the land portion 21 in accordance with the rotation of the rotation shaft 1. Accordingly, the lubricating oil can also be widely distributed between the bearing upper half portion 12 and the rotation shaft 1.

In addition, since the guide portion 22 is provided, the lubricating oil staying at the bearing lower half portion 11 can be actively supplied toward the bearing upper half portion 12. Accordingly, the bearing upper half portion 12 can be lubricated without increasing the lubricating oil supply amount. In other words, sufficient lubricating performance can be exhibited with a small amount of the lubricating oil.

Further, the guide portion 22 of the embodiment can be realized just by processing the guide metal 20. That is, the bearing upper half portion 12 can be lubricated without additionally providing other devices or members.

In addition, according to the above-described configuration, the bearing upper half portion 12 is provided with the plurality of (two) land portions 21 which are arranged at intervals in the direction of the axis O. Accordingly, since a load applied to each of the land portions 21 can be reduced, the rotation shaft 1 can be stably supported and the abrasion of the bearing upper half portion 12 (the guide metal 20) and the bearing lower half portion 11 (the bearing pad 15) due to aging can be suppressed.

Figure 5:
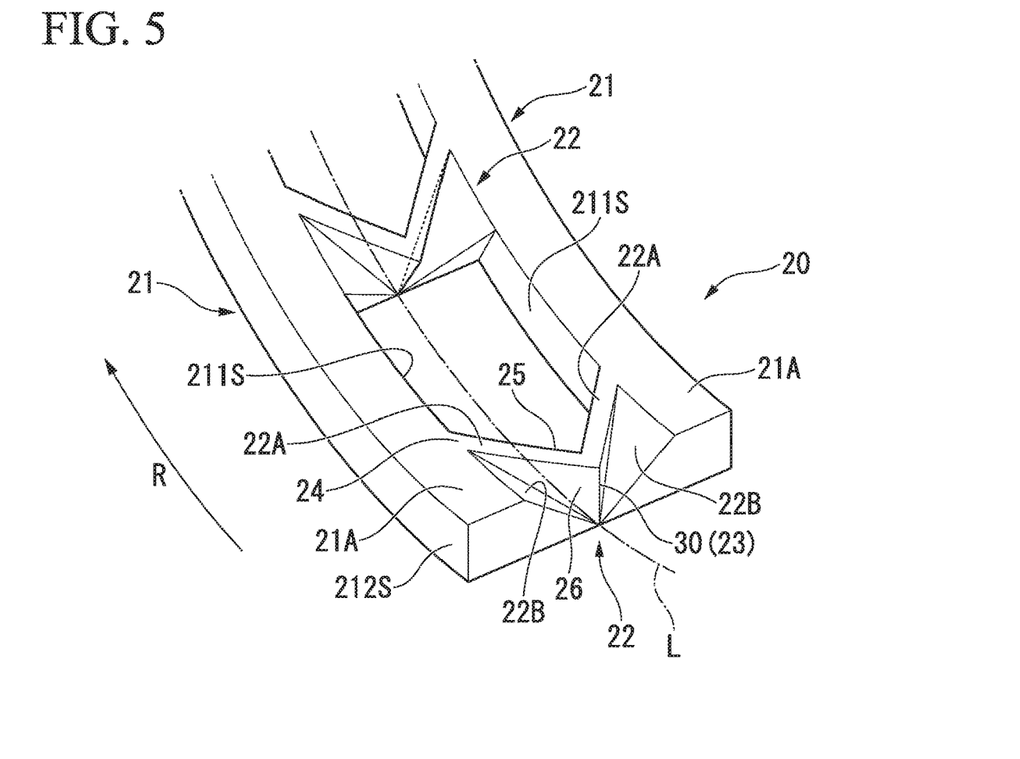
FIG. 5 is a diagram showing a modified example of the journal bearing according to the first embodiment of the present invention.

Further, in the first embodiment, an example in which the guide portion 22 is provided at the rear end of the guide metal 20 in the rotation direction R has been described. However, the position at which the guide portion 22 is provided or the number thereof is not limited thereto. Specifically, as shown in FIG. 5, a plurality of guide portions 22 may be provided at intervals in the circumferential direction of the guide metal 20.

According to such a configuration, it is possible to lubricate a wider range in the circumferential direction of the bearing upper half portion 12.

Second Embodiment

Figure 6:
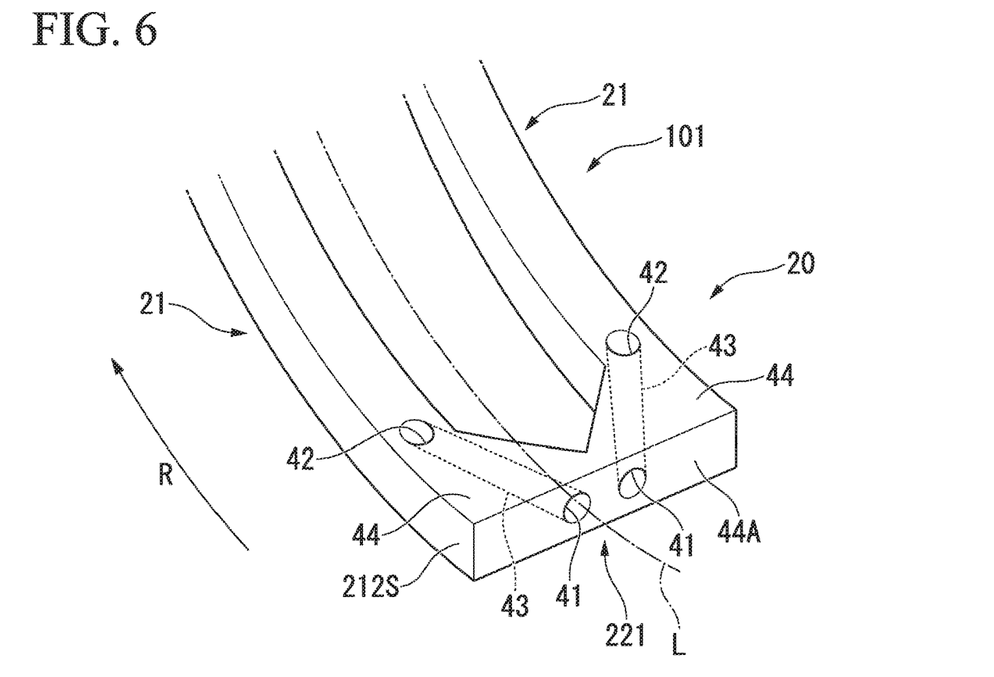
FIG. 6 is an enlarged view showing a land portion and a guide portion of a journal bearing according to a second embodiment of the present invention.

Next, a second embodiment of the present invention will be described with reference to FIG. 6. Further, the same reference numerals will be given to the components which are the same as those of the first embodiment and a detailed description thereof will be omitted.

In the journal bearing 101 of the embodiment, a guide portion 221 includes an inflow hole 41 into which lubricating oil flows, a supply hole 42 which supplies lubricating oil, and an oil supply pipe 43 which communicates the inflow hole 41 and the supply hole 42 with each other.

A rear end of each land portion 21 in the rotation direction R is provided with a plate-shaped connection portion 44 which extends from a pair of land portion inner surfaces 211S to an equidistant line L. The connection portions 44 are connected on the equidistant line L. Further, a dimension of the connection portion 44 in the radial direction is set to be substantially the same as a dimension of the land portion 21 in the radial direction.

A rear end surface of the connection portion 44 in the rotation direction R is formed as a connection portion end surface 44A. The inflow hole 41 which opens toward the rear side in the rotation direction R is formed on the connection portion end surface 44A. Meanwhile, the supply hole 42 which opens toward the inside in the radial direction is formed on a sliding surface 21A of the land portion 21. The inflow hole 41 and the supply hole 42 communicate with each other by the oil supply pipe 43. The oil supply pipe 43 is formed as a circular pipe in a cross-sectional view to have the same inner diameter dimension from the inflow hole 41 to the supply hole 42.

According to such a configuration, the lubricating oil which flows through the inflow hole 41 from the rear side in the rotation direction R is supplied onto the sliding surface 21A passing through the oil supply pipe 43 and the supply hole 42. Accordingly, the bearing upper half portion 12 and the rotation shaft 1 can be lubricated through the lubricating oil on the sliding surface 21A similarly to the first embodiment.

Additionally, in the embodiment, the oil supply pipe 43 has a circular cross-section and the inner diameter dimension thereof is assumed to be uniform over the entire oil supply pipe 43 in the extension direction. However, the form of the oil supply pipe 43 is not limited thereto. For example, the oil supply pipe may be formed so that the inner diameter dimension gradually decreases from the inflow hole 41 toward the supply hole 42. According to such a configuration, as a pressure applied to the lubricating oil increases from the inflow hole 41 toward the supply hole 42, the flow rate of the lubricating oil reaching the supply hole 42 can be increased. As the flow rate increases, the lubricating oil can reach a further wider area in the circumferential direction of the land portion 21.

Third Embodiment

Figure 7:
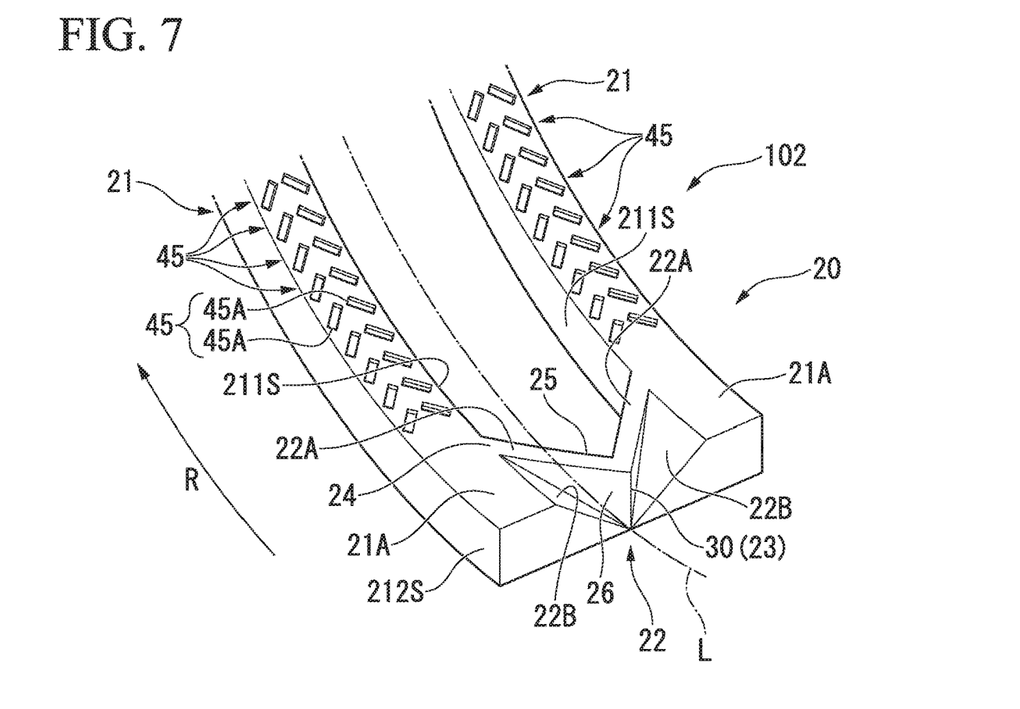
FIG. 7 is an enlarged view showing a land portion and a guide portion of a journal bearing according to a third embodiment of the present invention.

Next, a third embodiment of the present invention will be described with reference to FIG. 7. As shown in FIG. 7, a journal bearing 102 of the embodiment includes a plurality of guide grooves 45 formed at intervals in the circumferential direction on a sliding surface 21A of a land portion 21 in addition to the guide portion 22 described in the first embodiment.

More specifically, the guide groove 45 includes a pair of grooves 45A which extend from both edges of the land portion 21 in the direction of the axis O to gradually approach a center of the land portion 21 in the direction of the axis O. Each groove 45A extends to be inclined toward a center from en edge of the land portion 21 in the direction of the axis O as it goes from the rear side toward the front side in the rotation direction R. Accordingly, the pair of grooves 45A form a substantially V-shape when viewed from the radial direction with respect to the axis O. Further, a sufficient dimensional allowance is formed between a bottom portion (an outer surface in a radial direction) of the groove 45A and an outer surface of the land portion 21 in a radial direction. In other words, the groove 45A is recessed so as not to penetrate the land portion 21 in the radial direction.

According to such a configuration, the lubricating oil supplied onto the sliding surface 21A is guided toward a center area on the sliding surface 21A in the direction of the axis O by the guide groove 45. Accordingly, a film thickness of an oil film of the lubricating oil formed on the sliding surface 21A can be maintained.

Meanwhile, when such a guide groove 45 is not formed, the lubricating oil is scattered outward from both sides of the land portion 21 in the direction of the axis O in accordance with the rotation of the rotation shaft 1. For this reason, there is a possibility that a sufficient amount of the lubricating oil cannot be supplied onto the sliding surface 21A at a position separated to the front side in the rotation direction R from the guide portion 22.

However, in the embodiment, such a possibility can be reduced since the guide groove 45 is formed on the sliding surface 21A. In other words, a sufficient amount of the lubricating oil can also be widely distributed at a position separated to the front side in the rotation direction R from the guide portion 22.

Additionally, an example in which the guide groove 45 includes the pair of independent grooves 45A has been described in the above-described embodiment. However, the form of the guide groove 45 is not limited thereto. For example, the pair of grooves 45A may be connected to each other at the front end in the rotation direction R and thereby to be form as one continuous groove.

Furthermore, each groove 45A may be formed so that a dimension in the direction of the axis O gradually changes from the rear side toward the front side in the rotation direction R.

Further, a dimension (a depth) of the guide groove 45 in the radial direction may be set to gradually decrease from the rear side toward the front side in the rotation direction R.

Furthermore, the guide groove 45 can also be applied to the journal bearing 101 of the second embodiment.

Fourth Embodiment

Next, a fourth embodiment of the present invention will be described with reference to FIGS. 8 to 10. Further, the same reference numerals will be given to the components which are the same as those of the above-described embodiments and a detailed description thereof will be omitted.

Figure 8:
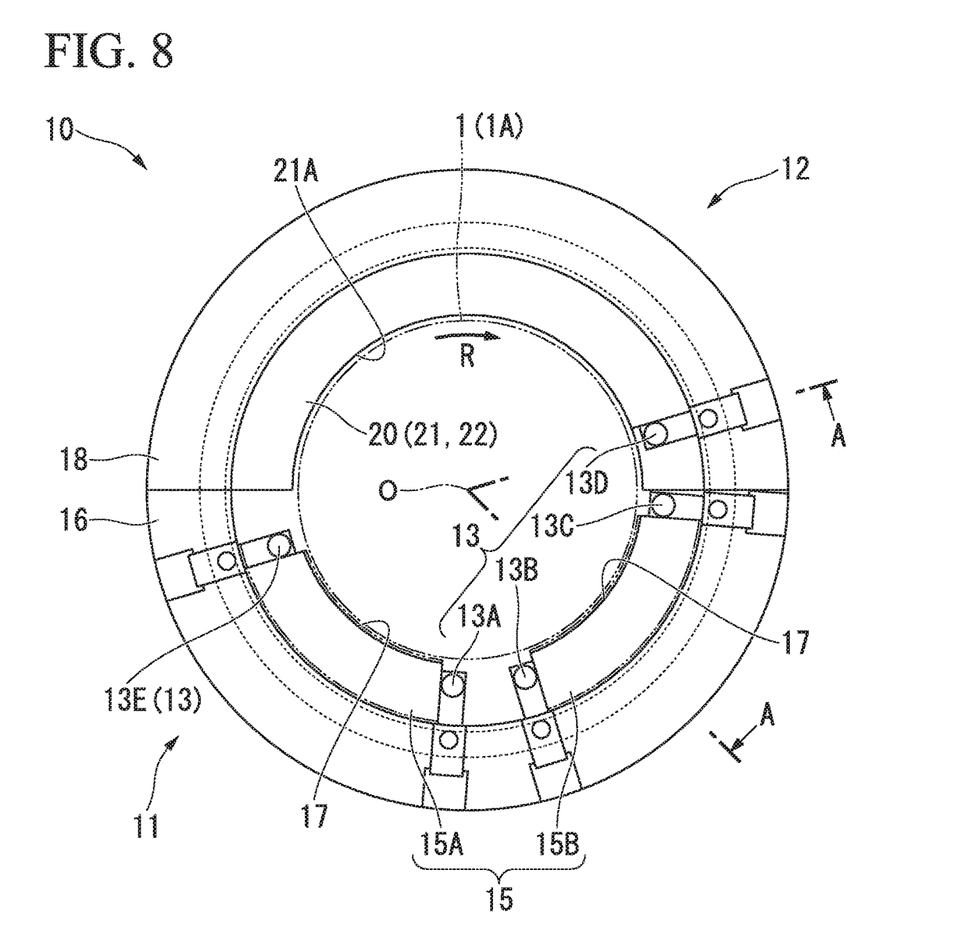
FIG. 8 is a diagram showing a journal bearing according to a fourth embodiment of the present invention when viewed from an axial direction.

As shown in FIG. 8, in a journal bearing 10 according of the embodiment, a lubricating oil supply device 13 further includes a fifth oil supply nozzle 13E (an end supply device) in addition to four oil supply nozzles (a first oil supply nozzle 13A, a second oil supply nozzle 13B, a third oil supply nozzle 13C, and a fourth oil supply nozzle 13D).

The fifth oil supply nozzle 13E is provided between a bearing lower half portion 11 and a bearing upper half portion 12 in the circumferential direction. More specifically, the fifth oil supply nozzle 13E is provided at a front end of a front pad 15A in the rotation direction R. The fifth oil supply nozzle 13E also blows lubricating oil supplied from the outside toward the rotation shaft 1 similar to the other oil supply nozzles.

Figure 9:
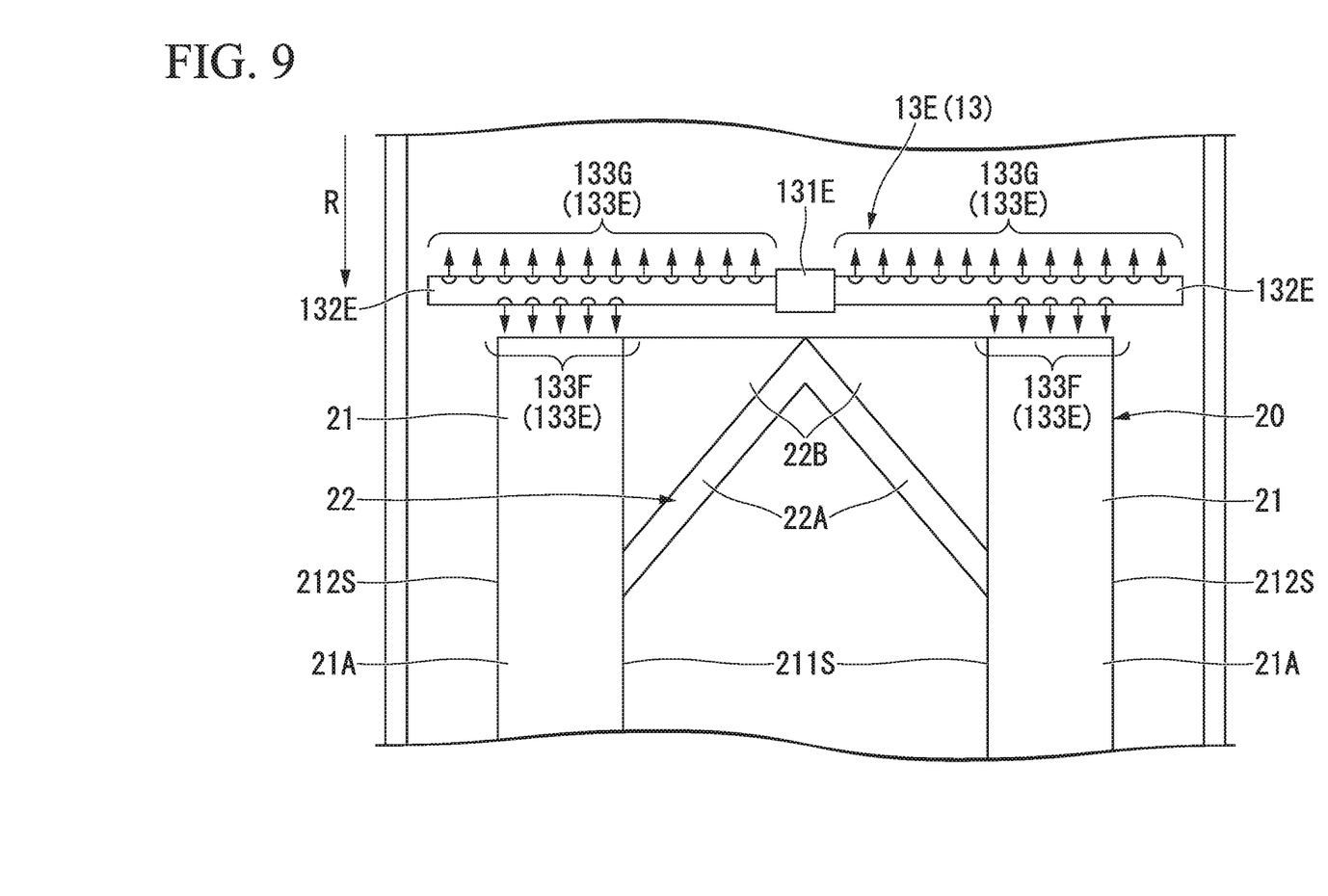
FIG. 9 is a schematic diagram showing a configuration of an oil supply nozzle according to the fourth embodiment of the present invention.
Figure 10:
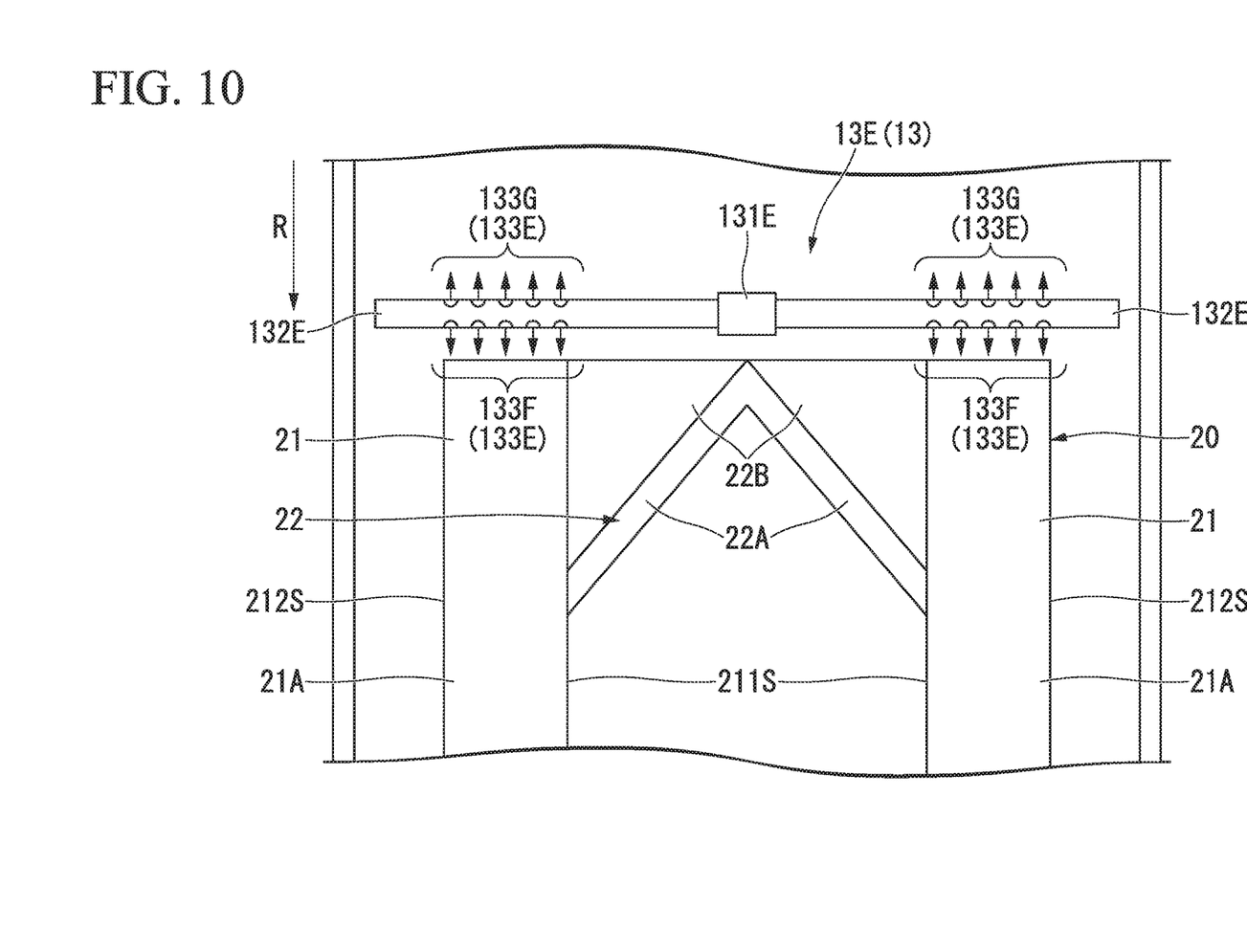
FIG. 10 is a diagram showing a modified example of the oil supply nozzle according to the fourth embodiment of the present invention.

As shown in FIG. 9, the fifth oil supply nozzle 13E includes an introduction portion 131E which is formed at a substantial center in the direction of the axis O and a pair of bar-shaped injection portions 132E which extends from the introduction portion 131E toward both sides in the direction of the axis O.

The introduction portion 131E is connected to a lubricating oil supply source (not shown) including a tank or a pump provided to the outside. The lubricating oil flowing through the introduction portion 131E is divided into both sides in the direction of the axis O within the introduction portion 131E and is guided into the pair of injection portions 132E.

Surfaces facing both sides of the injection portion 132E in the rotation direction R are provided with a plurality of injection holes 133E which are arranged in the direction of the axis O to blow the lubricating oil flowing therein. Among the plurality of injection holes 133E, the injection holes 133E which open to the front side in the rotation direction R are formed as a front supply part 133F. The front supply part 133F is provided only at a position separated from the introduction portion 131E in the direction of the axis O. More specifically, the front supply part 133F is provided in an area corresponding to the land portion 21 in the direction of the axis O. Further specifically, the front supply part 133F is provided at the same position as that of the land portion 21 in the direction of the axis O. That is, the front supply part 133F can directly blow out the lubricating oil only to the land portion 21 among the pair of land portions 21 and 21 and the inclined portion 22B surrounded by the land portions 21 and 21 from both sides thereof in the direction of the axis O.

Among the plurality of injection holes 133E, the injection holes 133E which open to the rear side in the rotation direction R are formed as a rear supply part 133G. The rear supply part 133G is formed over the entire injection portion 132E in the direction of the axis O. In other words, the rear supply part 133G is provided in an area corresponding to the bearing lower half portion 11 (the front pad 15A) in the direction of the axis O. Accordingly, the rear supply part 133G can blow the lubricating oil toward the front pad 15A located on the rear side in the rotation direction R when viewed from the fifth oil supply nozzle 13E.

According to the above-described configuration, the lubricating oil can be sufficiently supplied to the bearing upper half portion 12 and the bearing lower half portion 11 by the front supply part 133F and the rear supply part 133G. Particularly, as compared to a case in which the lubricating oil is supplied only to the inside in the radial direction with respect to the axis O, the lubricating oil can be more actively supplied to the bearing upper half portion 12 and the bearing lower half portion 11.

Furthermore, according to the above-described configuration, since the front supply part 133F is provided in an area corresponding to the land portion 21 in the direction of the axis O, the lubricating oil can be directly supplied to the land portion 21. That is, a sufficient amount of the lubricating oil can be widely distributed in the land portion 21.

In addition, since the rear supply part 133G is provided in an area corresponding to the bearing lower half portion 11 in the direction of the axis O, the lubricating oil can be directly supplied to the bearing lower half portion 11. That is, a sufficient amount of the lubricating oil can be widely distributed in the bearing lower half portion 11.

Additionally, in the embodiment, an example in which the rear supply part 133G is formed in the entire injection portion 132E in the direction of the axis O has been described. However, the form of the rear supply part 133G is not limited to the above-described example. For example, the rear supply part may be provided in an area corresponding to the land portion 21 in the direction of the axis O as shown in FIG. 10. That is, in this case, the rear supply part 133G can blow the lubricating oil toward the front pad 15A located on the rear side in the rotation direction R when viewed from the fifth oil supply nozzle 13E.

According to such a configuration, the lubricating oil can also be supplied from the front side of the land portion 21 in the rotation direction R thereto. That is, the lubricating oil can be distributed more sufficiently in the land portion 21.

Although the embodiments of the present invention have been described in detail with reference to the drawings, the detailed configuration is not limited to these embodiments and includes a modification in design and the like within the scope not deviating from the gist of the present invention.

According to the above-described configuration, it is possible to provide a journal bearing capable of exhibiting sufficient lubrication performance with a small amount of lubricating oil. Further, it is possible to provide a rotary machine which can be operated stably by supporting a rotation shaft using such a journal bearing.

The invention claimed is:
1. A journal bearing comprising:
 a bearing lower half portion which slidably supports an outer circumferential surface of a rotation shaft rotatable about an axis extending in a horizontal direction from below;
 a bearing upper half portion which supports an upper side half portion of the outer circumferential surface of the rotation shaft; and a lubricating oil supply device which supplies lubricating oil between the bearing lower half portion, the bearing upper half portion and the rotation shaft, wherein the bearing upper half portion includes:
- a bearing body which faces the outer circumferential surface of the upper side half portion of the rotation shaft with a gap therebetween;
- a land portion which protrudes inward in a radial direction from an inner circumferential surface of the bearing body to form a sliding surface with respect to the rotation shaft, wherein the sliding surface extends in a circumferential direction; and
- a guide portion which guides the lubricating oil to the sliding surface of the land portion, wherein the lubricating oil supply device includes an end supply device which is provided between the bearing upper half portion and the bearing lower half portion in a circumferential direction of the rotation shaft, and wherein the end supply device includes a front supply part which blows the lubricating oil toward a front side in the rotation direction and a rear supply part which blows the lubricating oil toward a rear side in the rotation direction.

2. The journal bearing according to claim 1, wherein the guide portion includes:
- an oil collecting wall which is provided on the inner circumferential surface and extends towards the land portion from the inner circumferential surface as it goes from the rear side in a rotation direction of the rotation shaft toward the front side in the rotation direction, and
- an inclined portion which is provided at the rear side in the rotation direction of the oil collecting wall and extends obliquely from the inner circumferential surface toward the sliding surface.

3. The journal bearing according to claim 1, further comprising:
- a pair of the land portions arranged in the horizontal direction with a gap therebetween, and
- a connection portion which extends from a land portion inner surface to an equidistant line which equally divides an area between the pair of the land portions, wherein the guide portion is formed of:
- an inflow hole which is formed on an end surface of the connection portion at the rear side in the rotation direction and into which the lubricating oil flows,
- a supply hole which is formed on the sliding surface and supplies the lubricating oil onto the sliding surface, and
- an oil supply pipe which communicates the inflow hole and the supply hole with each other.

4. The journal bearing according to claim 1, wherein the bearing upper half portion includes a plurality of the land portions and a plurality of the guide portions arranged in the circumferential direction.

5. The journal bearing according to claim 1, wherein the bearing upper half portion includes a plurality of the land portions arranged at intervals in the horizontal direction.

6. The journal bearing according to claim 1, wherein the front supply part is provided at the same position as that of the land portion in the horizontal direction.

7. The journal bearing according to claim 1, wherein the rear supply part is provided over an entire length of the bearing lower half portion in the horizontal direction.

8. The journal bearing according to claim 1, wherein the rear supply part is provided at the same position as that of the land portion in the horizontal direction.

9. A rotary machine comprising:
- a journal bearing according to claim 1; and
- the rotation shaft which is supported by the journal bearing.

* * * * *